(12) United States Patent
Steinhauser

(10) Patent No.: US 10,421,825 B2
(45) Date of Patent: Sep. 24, 2019

(54) METHANOL-TERMINATED POLYMERS CONTAINING ETHER

(71) Applicant: ARLANXEO Deutschland GmbH, Dormagen (DE)

(72) Inventor: Norbert Steinhauser, Monheim (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 0 days.

(21) Appl. No.: 15/646,260

(22) Filed: Jul. 11, 2017

(65) Prior Publication Data

US 2017/0306058 A1   Oct. 26, 2017

Related U.S. Application Data

(63) Continuation of application No. 13/885,228, filed as application No. PCT/EP2011/069856 on Nov. 10, 2011, now Pat. No. 9,758,596.

(30) Foreign Application Priority Data

Nov. 16, 2010   (EP) ..................................... 10191348

(51) Int. Cl.
| | | |
|---|---|---|
| *C08C 19/00* | (2006.01) | |
| *C08C 19/44* | (2006.01) | |
| *C08F 2/38* | (2006.01) | |
| *C08L 15/00* | (2006.01) | |
| *C08F 236/10* | (2006.01) | |
| *C08K 3/36* | (2006.01) | |
| *C08K 5/548* | (2006.01) | |
| *C08L 9/00* | (2006.01) | |

(52) U.S. Cl.
CPC .............. *C08C 19/00* (2013.01); *C08C 19/44* (2013.01); *C08F 2/38* (2013.01); *C08F 236/10* (2013.01); *C08L 15/00* (2013.01); *C08K 3/36* (2013.01); *C08K 5/548* (2013.01); *C08L 9/00* (2013.01)

(58) Field of Classification Search
CPC . C08C 19/00; C08C 19/44; C08F 2/38; C08F 236/10; C08L 15/00; C08L 9/00; C08K 3/36; C08K 5/548
USPC .......................................................... 524/526
See application file for complete search history.

(56) References Cited

U.S. PATENT DOCUMENTS

| | | | |
|---|---|---|---|
| 9,758,596 B2 * | 9/2017 | Steinhauser | ............ C08C 19/44 |
| 2010/0068560 A1 * | 3/2010 | Bouwmeester | .......... C08J 3/245 |
| | | | 428/688 |

* cited by examiner

*Primary Examiner* — Josephine L Chang
(74) *Attorney, Agent, or Firm* — Norris McLaughlin, P.A.

(57) ABSTRACT

The present invention relates to polymers functionalized by terminal groups that have, at the chain ends thereof, an ether-containing group of the formula (V)

—[—O-A-O⁻]$_n$X$^{n+}$     (V)

where A is a divalent organic moiety, and X is either H, and n=1, or X is a metal and n is an integer of 1 to 4.

18 Claims, No Drawings

METHANOL-TERMINATED POLYMERS CONTAINING ETHER

This application is a continuation of pending U.S. patent application Ser. No. 13/885,228 filed Aug. 28, 2013, with the same title, which claims the right of priority under 35 U.S.C. § 119 (a)-(d) and 35 U.S.C. § 365 of International Application No. PCT/2011/069856, filed Nov. 10, 2011, which is entitled to the right of priority of European Patent Application Nos. 10191348.1 filed Nov. 16, 2010, the contents of which are hereby incorporated by reference in their entirety.

The invention relates to the polymers functionalized by terminal groups, and to the production and use of the polymers.

Important desirable properties in tyre treads are good adhesion to dry and wet surfaces, low rolling resistance, and also high abrasion resistance, but it is very difficult to improve the skid resistance of a tyre without simultaneously impairing rolling resistance and abrasion resistance. Low rolling resistance is important for low fuel consumption, and high abrasion resistance is the decisive factor for high tyre lifetime.

The wet skid resistance and rolling resistance of a tyre tread are highly dependent on the dynamic mechanical properties of the rubbers used in producing the mixture. Rubbers with high rebound resilience at relatively high temperatures (60° C. to 100° C.) are used for the tyre tread in order to lower rolling resistance. On the other hand, rubbers with a high damping factor at low temperatures (0° to 23° C.) and, respectively, with low rebound resilience in the range from 0° C. to 23° C. are advantageous for improving wet skid resistance. In order to comply with this complex combination of requirements, the tyre tread uses mixtures made of various rubbers. The mixtures usually used are made of one or more rubbers with relatively high glass transition temperature, e.g. styrene-butadiene rubber, and of one or more rubbers with relatively low glass transition temperature, e.g. polybutadiene having high 1,4-cis content or a styrene-butadiene rubber having low styrene content and low vinyl content or a polybutadiene produced in solution having moderate 1,4-cis content and low vinyl content.

Anionically polymerized solution rubbers containing double bonds, e.g. solution polybutadiene and solution styrene-butadiene rubbers, have advantages over corresponding emulsion rubbers for producing tyre treads with low rolling resistance. The advantages consist inter alia in controllability of vinyl content and the glass transition temperature and molecular branching associated therewith. This leads to particular practical advantages in the relationship between wet skid resistance and rolling resistance of the tyre. Significant contributions to energy dissipation, and therefore to rolling resistance in tyre treads, come from free polymer chain ends and from reversible formation and disjunction of the filler network which is formed by the filler (mostly silica and/or carbon black) used in the tyre tread mixture.

Introduction of functional groups at the polymer chain ends permits physical or chemical linkage of the said chain ends to the surface of the filler. This leads to restricted freedom of motion thereof, and therefore to reduced energy dissipation when the tyre tread is subject to dynamic stress. At the same time, the said functional terminal groups can improve the dispersion of the filler in the tyre tread, and this can lead to weakening of the filler network and thus to a further reduction of rolling resistance.

Numerous methods for modifications of terminal groups have therefore been developed. By way of example, EP 0 180 141 A1 describes the use of 4,4'-bis(dimethylamino)benzophenone or N-methylcaprolactam as functionalization reagents. The use of ethylene oxide and N-vinylpyrrolidone is also known from EP 0 864 606 A1. U.S. Pat. No. 4,417,029 lists a number of other possible functionalization reagents.

Silanes which have a total of at least two halogen substituents and/or alkyloxy substituents and/or aryloxy substituents on silicon in particular have good suitability for functionalization of terminal groups of diene rubbers since one of the abovementioned substituents on the Si atom can easily be replaced by an anionic diene polymer chain end, and the other abovementioned substituent(s) on Si is/are available as functional group which, optionally after hydrolysis, can interact with the filler of the tyre tread mixture. Examples of silanes of this type are found in U.S. Pat. Nos. 3,244,664, 4,185,042, and EP 0 890 580 A1.

However, many of the abovementioned functionalization reagents have disadvantages, e.g. poor solubility in the process solvent, high toxicity or high volatility, and this can lead to contamination of the returned solvent. Furthermore, many of the said functionalization reagents can react with more than one anionic polymer chain end, and this leads to coupling reactions which are often disruptive and difficult to control. This is especially true for the abovementioned silanes. These also have the further disadvantage that reaction of the said silanes with the anionic polymer chain end involves cleavage of components such as halides or alkoxy groups, and the latter are easily convened to alcohols. Halides promote corrosion; alcohols can lead to contamination of the process solvent. A further disadvantage in the use of silanes as functionalization reagents is that, after the functionalization process, the resultant siloxane-terminated polymers can couple by way of the Si—OR groups at the polymer chain ends (or by way of the Si—OH groups after hydrolysis of the Si—OR groups) with formation of Si—O—Si bonds, and this leads to an undesired increase in the viscosity of the rubbers during work-up and storage. Many methods have been described for reducing the said viscosity increase in siloxane-terminated polymers, examples being addition of stabilizing reagents based on acid and acyl halides (EP 0 801 078 A1), addition of siloxane (EP 1 198 506 B1), addition of long chain alcohols (EP 1 237 934 B1) and addition of reagents for pH control (EP 1 726 598).

It was therefore an object to provide polymers which are functionalized by terminal groups and which do not have the disadvantages of the prior art, examples being reaction of a plurality of anionic polymer chain ends per functionalization reagent, elimination of the problematic components and coupling with formation of Si—O—Si bonds during work-up and storage.

Polymers functionalized by terminal groups are proposed for solving the said problem and have, at the polymer chain end, an ether-containing carbinol group of the formula (I)

where A is a divalent organic moiety which can comprise not only C and H but also heteroatoms, such as O, N, S, Si.

The polymers according to the invention, functionalized by terminal groups, can preferably take the form of metal salts having terminal groups of the formula (II)

where
A is a divalent organic moiety which can comprise not only C and H but also heteroatoms, such as O, N, S, Si,
n is an integer from 1 to 4,
M is a metal or semimetal of valency from 1 to 4, preferably Li, Na, K, Mg, Ca, Fe, Co, Ni, Al, Nd, Ti, Si, Sn.

Preferred polymers for producing the polymers according to the invention, functionalized by terminal groups, are diene polymers and diene copolymers obtainable via copolymerization of dienes with vinylaromatic monomers.

Preferred dienes are 1,3-butadiene, isoprene, 1,3-pentadiene, 2,3-dimethylbutadiene, 1-phenyl-1,3-butadiene and/or 1,3-hexadiene. It is particularly preferable to use 1,3-butadiene and/or isoprene.

Examples of vinylaromatic comonomers that can be used are o-, m- and/or p-methylstyrene, p-tert-butylstyrene, α-methylstyrene, vinylnaphthalene, divinylbenzene, trivinylbenzene and/or divinyl-naphthalene. It is particularly preferable to use styrene.

These polymers are preferably produced by anionic solution polymerization or by polymerization using coordination catalysts. Coordination catalysts in this context mean Ziegler-Natta catalysts or monometallic catalyst systems. Preferred coordination catalysts are those based on Ni, Co, Ti, Zr, Nd, V, Cr, Mo, W or Fe.

Initiators for the anionic solution polymerization process are those based on alkali metal or on alkaline earth metal, e.g. methyllithium, ethyllithium, isopropyllithium, n-butyllithium, sec-butyllithium, pentyllithium, n-hexyllithium, cyclohexyllithium, octyllithium, decyllithium, 2-(6-lithio-n-hexoxy)tetrahydropyran, 3-(tert-butyldimethylsiloxy)-1-propyllithium, phenyllithium, 4-butylphenyllithium, 1-naphthyllithium, p-toluyllithium, lithium amides of secondary amines, e.g. lithium pyrrolidide, lithium piperidide, lithium hexamethylenimide, lithium diphenylamide. These lithium amides can also be produced in situ via reaction of an organolithium compound with secondary amines. It is also possible to use di- and polyfunctional organolithium compounds, e.g. 1,4-dilithiobutane, and dilithium piperazide. It is preferable to use n-butyllithium and sec-butyllithium.

It is also possible to use the known randomizers and control agents for the microstructure of the polymer, e.g. diethyl ether, di-n-propyl ether, diisopropyl ether, di-n-butyl ether, ethylene glycol dimethyl ether, ethylene glycol diethyl ether, ethylene glycol di-n-butyl ether, ethylene glycol di-tert-butyl ether, diethylene glycol dimethyl ether, diethylene glycol diethyl ether, diethylene glycol di-n-butyl ether, diethylene glycol di-tert-butyl ether, 2-(2-ethoxyethoxy)-2-methylpropan, triethylene glycol dimethyl ether, tetrahydrofuran, ethyl tetrahydrofurfuryl ether, hexyl tetrahydrofurfuryl ether, 2,2-bis(2-tetrahydrofuryl)propane, dioxane, trimethylamine, triethylamine, N,N,N',N'-tetramethylethylenediamine, N-methylmorpholine. N-ethylmorpholine, 1,2-dipiperidinoethane, 1,2-dipyrrolidinoethane, 1,2-dimorpholinoethane, and also the potassium and sodium salts of alcohols, of phenols, of carboxylic acids and of sulphonic acids.

Solution polymerization processes of this type are known and are described by way of example in I. Franta, Elastomers and Rubber Compounding Materials; Elsevier 1989, pp. 113-131, in Houben-Weyl, Methoden der Organischen Chemie [Methods of Organic Chemistry], Thieme Verlag, Stuttgart, 1961, Volume XIV/1, pp. 645 to 673 or Volume E 20 (1987), pp. 114 to 134 and pp. 134 to 153, and also in Comprehensive Polymer Science, Vol. 4, Part II (Pergamon Press Ltd., Oxford 1989), pp. 53-108.

The preferred dienehomo- and copolymers are preferably produced in a solvent. Preferred solvents used for the polymerization process are inert aprotic solvents, e.g., paraffinic hydrocarbons, such as isomeric butanes, pentanes, hexanes, heptanes, octanes and decanes, cyclopentane, cyclohexane, methylcyclohexane, ethylcyclohexane or 1,4-dimethylcyclohexane, or aromatic hydrocarbons, such as benzene, toluene, ethylbenzene, xylene, diethylbenzene or propylbenzene. These solvents can be used individually or in combination. Preference is given to cyclohexane and n-hexane. Blending with polar solvents is likewise possible.

The amount of solvent for the process according to the invention is usually from 100 to 1000 g, preferably from 200 to 700 g, based on 100 g of the entire amount of monomer used. However, it is also possible to polymerize the monomers used in the absence of solvents.

In a possible method for conducting the polymerization process, the monomers and the solvent are used as initial charge, and the polymerization process is then initiated via addition of the initiator or catalyst. It is also possible to polymerize the materials in a feed process in which monomers and solvent are added to the polymerization reactor, where the initiator or catalyst is used as initial charge or is added with the monomers and the solvent. There are possible variations, for example use of the solvent as initial charge in the reactor, addition of the initiator or catalyst and then addition of the monomers. It is also possible to operate the polymerization process continuously. In all cases, it is possible to add further monomer and solvent during, or at the end of, the polymerization process.

The polymerization time can vary widely from a few minutes to some hours. The polymerization time is usually about 10 minutes up to 8 hours, preferably from 20 minutes to 4 hours. The polymerization process can be conducted either at atmospheric pressure or else at elevated pressure (from 1 to 10 bar).

Surprisingly, it has been found that the use of one or more cycloperoxides as functionalization reagents can produce polymers which are functionalized by terminal groups and which do not have the disadvantages of the prior art. By way of example, no coupling processes can occur via multiple reactions at the functionalization reagent, no cleavage of problematic components can occur, and nor can coupling processes occur via formation of Si—O—Si bonds during work-up and storage.

The cycloperoxides are compounds of the general formula (III)

where
A is a divalent organic moiety which can comprise not only C and H but also heteroatoms such as O, N, S, Si.

Examples of compounds of the formula (III) are:

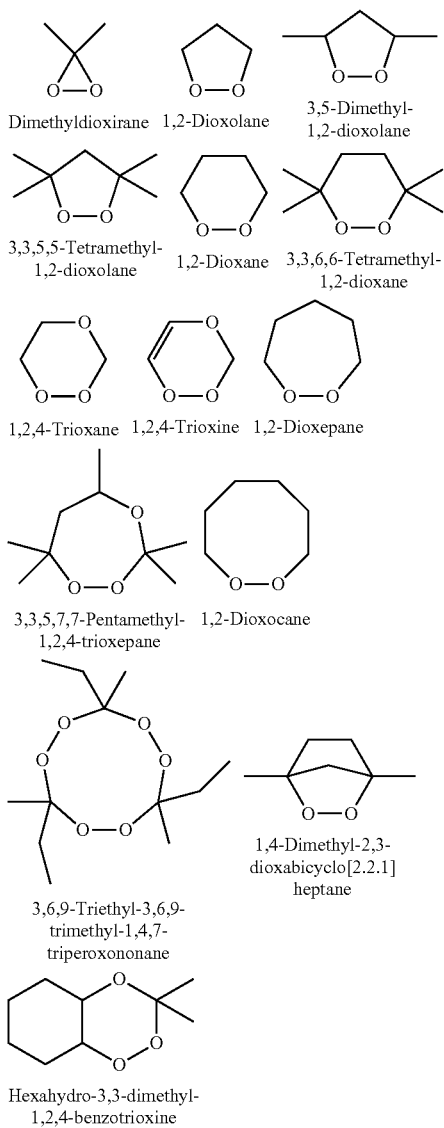

It has been found that the polymers according to the invention, functionalized by terminal groups, can be produced via reaction of reactive polymer chain ends with cycloperoxides and optional subsequent protonation of the terminal alcoholate group to give the alcohol.

The invention therefore also provides the use of cycloperoxides as functionalization reagents for producing the polymers according to the invention, functionalized by terminal groups, having terminal groups of the formula (I) or (II).

The average molar masses (number average) of the polymers according to the invention are preferably from 10 000 to 2 000 000 g/mol, with preference from 100 000 to 1 000 000 g/mol, and the glass transition temperatures of these polymers are from −110° C. to +20° C., preferably from −110° C. to 0° C., and the Mooney viscosities ML 1+4 (100° C.) of these polymers are from 10 to 200 Mooney units, preferably from 30 to 150 Mooney units.

The invention further provides a process for producing the polymers according to the invention, functionalized by terminal groups, where one or more compounds of the formula (III) in the form of pure material, solution or suspension is/are added to polymers having reactive polymer chain ends. The addition preferably takes place after conclusion of the polymerization reaction; however, it can also take place prior to complete monomer conversion. The reaction of compounds of the formula (III) with polymers having reactive polymer chain ends takes place at the temperatures usually used for the polymerization reaction. The reaction times for the reaction of compounds according to formula (III) with the reactive polymer chain ends can be from some minutes to a number of hours.

The amount of the said compounds can be selected in such a way that all of the reactive polymer chain ends react with compounds of the formula (III), or a substoichiometric amount of the said compounds can be used. The amounts used of the compounds according to formula (III) can cover a wide range. The preferred amounts are from 0.005 to 2% by weight, particularly from 0.01 to 1% by weight, based on the amount of polymer.

In addition to compounds according to formula (III) it is also possible to use the coupling reagents that are typically used for the anionic diene-polymerization process, for the reaction with the reactive polymer chain ends. Examples of these coupling reagents are silicon tetrachloride, methyltrichlorosilane, dimethyldichlorosilane, tin tetrachloride, dibutyltin dichloride, tetraalkoxysilanes, ethylene glycol diglycidyl ether and 1,2,4-tris(chloromethyl)benzene. These coupling reagents can be added prior to the compounds of the formula (III), together with these, or after these.

After addition of components of the formula (III) and optionally of coupling reagents, the conventional antioxidants, such as sterically hindered phenols, aromatic amines, phosphites, and thioethers, are preferably added prior to or during the work-up of the ether-containing carbinol-terminated polymers according to the invention. It is also possible to add the conventional extender oils used for diene rubbers, e.g. DAE (Distillate Aromatic Extract) oils, TDAE (Treated Distillate Aromatic Extract) oils, MES (Mild Extraction Solvate) oils, RAE (Residual Aromatic Extract) oils, TRAE (Treated Residual Aromatic Extract) oils, and naphthenic and heavy naphthenic oils. It is also possible to add fillers, such as carbon black and silica, and rubbers and rubber auxiliaries.

The solvent can be removed from the polymerization process by the conventional methods, such as distillation, steam stripping, or application of a vacuum, optionally at elevated temperature.

The invention further provides the use of the polymers according to the invention, functionalized by terminal groups, for producing vulcanizable rubber compositions.

It is preferable that the said vulcanizable rubber compositions comprise further rubbers, fillers, rubber chemicals, processing aids and extender oils.

Examples of additional rubbers are natural rubber and also synthetic rubbers. The amount of these, to the extent that they are present, is usually in the range from 0.5 to 95% by weight, preferably from 10 to 80% by weight, based on the total amount of polymer in the mixture. The amount of rubbers additionally added in turn depends on the respective intended use of the rubber compositions according to the invention.

A list of synthetic rubbers known from the literature is given here by way of example. They comprise inter alia
BR Polybutadiene
ABR Butadiene/$C_1$-$C_4$-alkyl acrylate copolymers
IR Polyisoprene ESBR Styrene-butadiene copolymers having from 1-60% by weight styrene contents, preferably from 20-50% by weight, produced via emulsion polymerization SSBR Styrene-butadiene copolymers having from 1-60% by weight styrene contents, preferably from 15-45% by weight, produced via solution polymerization IR Isobutylene-isoprene copolymers NBR Butadiene-acrylonitrile copolymers having from 5 to 60% by weight acrylonitrile contents, preferably from 10-40% by weight HNBR Partially hydrogenated or fully hydrogenated NBR rubber EPDM Ethylene-propylene-diene terpolymers and also mixtures of the said rubbers. Materials of interest for producing motor vehicle tyres are in particular natural rubber, ESBR and SSBR with glass transition temperature above −60° C., polybutadiene rubber having high cis-content (>90%), which has been produced using catalysts based on Ni, Co, Ti or Nd, and also polybutadiene rubber having up to 80% vinyl content, and also mixtures of these.

Fillers that can be used for the rubber compositions according to the invention are any of the known fillers used in the rubber industry. These comprise active and inert fillers.

Examples that may be mentioned are:

fine-particle silicas, produced by way of example via precipitation from solutions of silicates or via flame hydrolysis of silicon halides with specific surface areas of from 5 to 1000 $m^2/g$ (BET surface area), preferably from 20 to 400 $m^2/g$, and with primary particle sizes of from 10 to 400 nm. The silicas can, if appropriate, also take the form of mixed oxides with other metal oxides, such as oxides of Al, of Mg, of Ca, of Ba, of Zn, of Zr, or of Ti;

synthetic silicates, such as aluminium silicate, or alkaline earth metal silicate, e.g. magnesium silicate or calcium silicate, with BET surface areas of from 20 to 400 $m^2/g$ and with primary particle diameters of from 10 to 400 nm;

natural silicates, such as kaolin and any other naturally occurring form of silica;

glass fibres and glass-fibre products (mats, strands), or glass microbeads;

metal oxides, such as zinc oxide, calcium oxide, magnesium oxide, or aluminium oxide;

metal carbonates, such as magnesium carbonate, calcium carbonate, or zinc carbonate;

metal hydroxides, e.g. aluminium hydroxide or magnesium hydroxide;

metal sulphates, such as calcium sulphate or barium sulphate;

carbon blacks: The carbon blacks for use here are those prepared by the flame process, channel process, furnace process, gas process, thermal process, acetylene process or arc process, their BET surface areas being from 9 to 200 $m^2/g$, e.g. SAF, ISAF-LS, ISAF-HM, ISAF-LM, ISAF-HS, CF, SCF, HAF-LS, HAF, HAF-HS, FF-HS, SPF, XCF, FEF-LS, FEF, FEF-HS, GPF-HS, GPF, APF, SRF-LS, SRF-LM, SRF-HS, SRF-HM and MT carbon blacks, or the following types according to ASTM classification: N110, N219, N220, N231, N234, N242, N294, N326, N327, N330, N332, N339, N347, N351, N356, N358, N375, N472, N539, N550, N568, N650, N660, N754, N762, N765, N774, N787 and N990 carbon blacks;

rubber gels, in particular those based on BR, ESBR and/or polychloroprene with particle sizes from 5 to 1000 nm.

Preferred fillers used are fine-particle silicas and/or carbon blacks.

The fillers mentioned can be used alone or in a mixture. In one particularly preferred embodiment, the rubber compositions comprise, as fillers, a mixture composed of pale-coloured fillers, such as fine-particle silicas, and of carbon blacks, where the mixing ratio of pale-coloured fillers to carbon blacks is from 0.01:1 to 50:1, preferably from 0.05:1 to 20:1.

The amounts used of the fillers here are in the range from 10 to 500 parts by weight based on 100 parts by weight of rubber. It is preferable to use from 20 to 200 parts by weight.

In another embodiment of the invention, the rubber compositions also comprise rubber auxiliaries, which by way of example improve the processing properties of the rubber compositions, or serve for the crosslinking of the rubber compositions, or improve the physical properties of the vulcanizates produced from the rubber compositions of the invention, for the specific intended purpose of the said vulcanizates, or improve the interaction between rubber and filler, or serve for the coupling of the rubber to the filler.

Examples of rubber auxiliaries are crosslinking agents, e.g. sulphur or sulphur-donor compounds, and also reaction accelerators, antioxidants, heat stabilizers, light stabilizers, antiozone agents, processing aids, plasticizers, tackifiers, blowing agents, dyes, pigments, waxes, extenders, organic acids, silanes, retarders, metal oxides, extender oils, e.g. DAE (Distillate Aromatic Extract) oil, TDAE (Treated Distillate Aromatic Extract) oil, MES (Mild Extraction Solvate) oil, RAE (Residual Aromatic Extract) oil, TRAE (Treated Residual Aromatic Extract) oil, and naphthenic and heavy naphthenic oils, and also activators.

The total amount of rubber auxiliaries is in the range from 1 to 300 parts by weight, based on 100 parts by weight of entirety of rubber. It is preferable to use from 5 to 150 parts by weight of rubber auxiliaries.

The vulcanizable rubber compositions can be produced in a single-stage process or in a multistage process, and preference is given here to from 2 to 3 mixing stages. By way of example, the addition of sulphur and accelerator can therefore take place in a separate mixing stage, e.g. on a roll, preference being given here to temperatures in the range from 30° C. to 90° C. It is preferable that the addition of sulphur and accelerator takes place in the final mixing stage.

Examples of assemblies suitable for producing the vulcanizable rubber compositions are rolls, kneaders, internal mixers and mixing extruders.

The invention therefore also provides vulcanizable rubber compositions comprising polymers functionalized by terminal groups, having terminal groups of the formula (I) or (II).

The invention further provides the use of the vulcanizable rubber compositions according to the invention for producing rubber vulcanizates, in particular for the production of tyres, in particular of tyre treads, where these have particularly low rolling resistance with high wet skid resistance and abrasion resistance.

The vulcanizable rubber compositions according to the invention are also suitable for producing mouldings, e.g. for the production of cable sheathing, hoses, drive belts, conveyer belts, roll coverings, shoe soles, sealing rings and damping elements.

The examples below serve to illustrate the invention, without any resultant limiting effect.

EXAMPLES

Example 1a: Synthesis of Styrene-Butadiene Copolymer (Comparative Example)

The following were charged to an inertized 20 L reactor: 8.5 kg of hexane, 1125 g of 1,3-butadiene, 375 g of styrene, 28 mmol of 2,2-bis(2-tetrahydrofuryl)propene and also 10 mmol of butyllithium, and the contents were heated to 70° C. The mixture was polymerized for 1 h at 70° C. with stirring. The rubber solution was then discharged, and stabilized by adding 3 g of Irganox® 1520 (2,4-bis(octylthiomethyl)-6-methylphenol) and the solvent was removed by steam-stripping. The rubber crumb was dried in vacuo at 65° C.

Vinyl content (by IR spectroscopy): 51.5% by weight; styrene content (by IR spectroscopy): 24.7% by weight; glass transition temperature (DSC): −16° C.; number-average molar mass $M_n$ (GPC, PS standard): 242 kg/mol; $M_w/M_n$: 1.30; Mooney viscosity (ML1+4 at 100° C.): 71 MU

Example 1b: Synthesis of Ether-Containing Carbinol-Terminated Styrene-Butadiene Copolymer (According to the Invention)

The following were charged to an inertized 20 L reactor: 8.5 kg of hexane, 1125 g of 1,3-butadiene, 375 g of styrene, 29 mmol of 2,2-bis(2-tetrahydrofuryl)propane and also 10 mmol of butyllithium, and the contents were heated to 70° C. The mixture was polymerized for 1 h at 70° C. with stirring. Thereafter, 10 mmol (1.74 g) of 3,3,5,7,7-pentamethyl-1,2,4-trioxepane were added and the contents of the reactor were heated at 70° C. for a further 20 min. The rubber solution was then discharged and stabilized by adding 3 g of Irganox® 1520, and the solvent was removed by steam-stripping. The rubber crumb was dried in vacuo at 65° C.

Vinyl content (by IR spectroscopy): 51.3% by weight; styrene content (by IR spectroscopy): 24.8% by weight; glass transition temperature (DSC): −16° C.; number-average molar mass $M_n$ (GPC, PS standard): 254 kg/mol; $M_w/M_n$: 1.20; Mooney viscosity (ML1+4 at 100° C.): 73 MU

Example 1c: Synthesis of Ether-Containing Carbinol-Terminated Styrene-Butadiene Copolymer (According to the Invention)

The following were charged to an inertized 20 L reactor 8.5 kg of hexane, 1125 g of 1,3-butadiene, 375 g of styrene, 29 mmol of 2,2-bis(2-tetrahydrofuryl)propane and also 10 mmol of butyllithium, and the contents were heated to 70° C. The mixture was polymerized for 1 h at 70° C. with stirring. Thereafter, 10 mmol (2.64 g) of 3,6,9-triethyl-3,6,9-trimethyl-1,4,7-triperoxononane were added (in the form of 41% solution in isoparaffinic hydrocarbons) and the contents of the reactor were heated to 70° C. for a further 20 min. The rubber solution was then discharged and stabilized by adding 3 g of Irganox® 1520, and the solvent was removed by steam-stripping. The rubber crumb was dried in vacuo at 65° C.

Vinyl content (by IR spectroscopy): 51.4% by weight; styrene content (by IR spectroscopy): 24.8% by weight; glass transition temperature (DSC): −15° C.; number-average molar mass $M_n$ (GPC, PS standard): 257 kg/mol; $M_w/M_n$: 1.20; Mooney viscosity (ML1+4 at 100° C.): 75 MU

Examples 2a-c: Rubber Compositions

Tyre tread rubber compositions were produced which comprise the styrene-butadiene copolymer from Example 1a as comparative example (rubber composition 2a), and also the ether-containing carbinol-terminated styrene-butadiene copolymers according to the invention from Example 1b and 1c (rubber compositions 2b and 2c). Table 1 lists the constituents. The rubber compositions (without sulphur and accelerator) were produced in a 1.5 L kneader. The sulphur and accelerator constituents were then admixed on a roll at 40° C.

TABLE 1

Constituents of tyre tread rubber compositions
(data in phr: parts by weight per 100 parts by weight of rubber)

|  | Comparative example 2a | Inventive example 2b | Inventive example 2c |
| --- | --- | --- | --- |
| Styrene-butadiene copolymer from Example 1a | 70 | 0 | 0 |
| Ether-containing carbinol-terminated styrene-butadiene copolymer from Example 1b | 0 | 70 | 0 |
| Ether-containing carbinol-teminated styrene-butadiene copolymer from Example 1c | 0 | 0 | 70 |
| High-cis-content polybutadiene (BUNA™ CB 24 from Lanxess Deutschland GmbH) | 30 | 30 | 30 |
| Silica (Ultrasil ® 7000) | 90 | 90 | 90 |
| Carbon black (Vulcan ® J/N 375) | 7 | 7 | 7 |
| TDAE oil (Vivatec 500) | 36.3 | 36.3 | 36.3 |
| Processing aid (Aflux 37) | 3 | 3 | 3 |
| Stearic acid (Edenor C 18 98-100) | 1 | 1 | 1 |
| Antioxidant (Vulkanox ® 4020/LG from Lanxess Deutschland GmbH) | 2 | 2 | 2 |
| Antioxidant (Vulkanox ® HS/LG from Lanxess Deutschland GmbH) | 2 | 2 | 2 |
| Zinc oxide (Rotsiegel zinc white) | 2 | 2 | 2 |
| Wax (Antilux 654) | 2 | 2 | 2 |
| Silane (Si 69 ® from Evonik) | 7.2 | 7.2 | 7.2 |
| Diphenylguanidine (Vulkacit ® D/C from Lanxess Deutschland GmbH) | 2.2 | 2.2 | 2.2 |
| Sulphenamide (Vulkacit ® NZ/EGC from Lanxess Deutschland GmbH) | 1.6 | 1.6 | 1.6 |
| Sulphur (90/95 ground sulphur, Chancel) | 1.6 | 1.6 | 1.6 |
| Sulphonamide (Vulkalent ® E/C) | 0.2 | 0.2 | 0.2 |

Examples 3a-c: Vulcanizate Properties

The tyre tread rubber compositions of Examples 2a-c according to Table 1 were vulcanized at 160° C. for 20 minutes. The properties of the corresponding vulcanizates have been listed as Examples 3a-c in Table 2.

TABLE 2

Valcanizate properties

| | Comparative example 3a | Inventive example 3b | Inventive example 3c |
|---|---|---|---|
| Styrene-butadiene copolymer in vulcanizate: | | | |
| Styrene-butadiene copolymer from Example 1a | X | | |
| Ether-containing carbinol-terminated styrene-butadiene copolymer from Example 1b | | X | |
| Ether-containing carbinol-terminated styrene-butadiene copolymer from Example 1c | | | X |
| Vulcanizate properties: | | | |
| Rebound resilience at 23° C. [%] | 28 | 30 | 30 |
| Rebound resilience at 60° C. [%] | 50.5 | 54 | 54 |
| tan δ maximum (MTS amplitude sweep at 1 Hz, 60° C.) | 0.193 | 0.165 | 0.175 |
| tan δ at. 0° C. (dynamic damping at 10 Hz) | 0.291 | 0.342 | 0.346 |
| tan δ at 60° C. (dynamic damping at 10 Hz) | 0.120 | 0.111 | 0.108 |
| Elongation at break (S2 test specimen) [%] | 428 | 410 | 423 |
| Tensile stress at break (S2 test specimen) [MPa] | 18.3 | 18.7 | 18.9 |
| Abrasion (DIN 53516) [mm³] | 95 | 92 | 90 |

Tyre applications need low rolling resistance, and this is present if the values measured in the vulcanizate we high for rebound resilience at 60° C. and low for tan δ in dynamic damping at high temperature (60° C.) and low for tan δ maximum in the amplitude sweep. As can be seen in Table 2, the vulcanizates of Examples 3b and 3c according to the invention feature high rebound resilience at 60° C., low tan δ in dynamic damping at 60° C. and low tan δ maximum in the amplitude sweep.

Tyre applications also need high wet skid resistance and this is present when the vulcanizate has a high tan δ value in dynamic damping at low temperature (0° C.). As can be seen in Table 2, the vulcanizates of Examples 3b and 3c according to the invention feature a high tan δ value in dynamic damping at 0° C.

Tyre applications also need high abrasion resistance. As can be seen from Table 2, the vulcanizates of Examples 3b and 3c according to the invention feature low DIN abrasion.

What is claimed is:

1. Polymers functionalized by terminal groups, wherein:
    the polymers comprise diene polymers or diene copolymers obtained via copolymerization of dienes with vinylaromatic monomers, and functionalization with one or more cycloperoxides;
    the polymers comprise, at chain ends of the polymer chains, an ether-containing group of the formula (V)

$$-[-O-A-O-]_n X^{n+} \quad (V)$$

where:
        A is a divalent organic moiety, and
        X is M, n is an integer from 1 to 4, and M is a metal or semimetal having a valency of 1 to 4; and
    the average molar masses of the polymers are from 100,000 to 1,000,000 g/mol, the glass transition temperatures of the polymers are from −110° C. to 0° C., and the Mooney viscosities [ML 1+4 (100° C.)] of the polymers are from 30 to 150 Mooney units.

2. The polymers according to claim 1, wherein the ether-containing group of the formula (V) comprises a metal salt according to the formula (II)

$$-(-O-A-O^-)_n M^{n+} \quad (II)$$

where
        A is a divalent organic moiety comprising C and H, and
        M is Li, Na, K, Mg, Ca, Fe, Co, Ni, Al, Nd, Ti, Si, or Sn.

3. The polymers according to claim 1, wherein A is a divalent organic moiety comprising C, H and optionally heteroatoms selected from the group consisting of O, N, S, and Si.

4. The polymers according to claim 1, wherein the diene polymer is a polybutadiene, a polyisoprene, a butadiene-isoprene copolymer, a butadiene-styrene copolymer, an isoprene-styrene copolymer, or a butadiene-isoprene-styrene terpolymer.

5. The polymers according to claim 1, wherein the cycloperoxides are compounds of the general formula (III)

(III)

where A is a divalent organic moiety comprising C and H.

6. A process for producing the polymers according to claim 1, the process comprising:
    polymerizing the diene monomers or diene monomers and the vinylaromatic monomers to produce polymers having reactive polymer chain ends; and
    terminating the polymer chains by adding one or more cycloperoxides as functionalization agents to the polymers having reactive polymer chain ends to react the cycloperoxides with the reactive chain ends.

7. The process according to claim 6, further comprising adding the functionalization reagents after polymerization of the polymers.

8. The process according to claim 6, further comprising adding an excess of the functionalization reagents.

9. The process according to claim 8, wherein the amount of the functionalization reagents, based on the amount of polymer having reactive polymer chain ends, is 0.005 to 2% by weight.

10. The process according to claim 8, further comprising adding coupling reagents prior to, along with, or after adding the one or more peroxides to the polymers having reactive polymer chain ends.

11. The process according to claim 6, further comprising adding stoichiometric amounts or a substoichiometric amount of the functionalization reagents.

12. The process according to claim 11, wherein the amount of the functionalization reagents, based on the amount of polymer having reactive polymer chain ends, is 0.005 to 2% by weight.

13. A process for producing vulcanizable rubber compositions comprising the polymers functionalized by terminal groups according to claim 1, the process comprising mixing the polymers functionalized by terminal groups according to claim 1 with a vulcanizing agent.

14. Vulcanizable rubber compositions obtained according to the process of claim 13, wherein the composition comprises rubbers and/or rubber auxiliaries, and the rubber auxiliaries comprise antioxidants, oils, and/or fillers.

15. A method for producing moldings, the method comprising producing moldings from the vulcanizable rubber compositions according to claim 13.

16. Moldings obtained by the method according to claim 15, the moldings comprising a molding selected from the group consisting of cable sheathing, hoses, drive belts, conveyor belts, roll coverings, shoe soles, sealing rings and damping elements.

17. A method for producing at least tire treads of tires, the method comprising producing at least the tire treads from the vulcanizable rubber compositions according to claim 13.

18. Tires obtained by the method according to claim 17.

\* \* \* \* \*